Nov. 10, 1959 H. SCHAEVITZ 2,912,657
ANGULAR ACCELEROMETER
Filed May 24, 1956 2 Sheets-Sheet 1
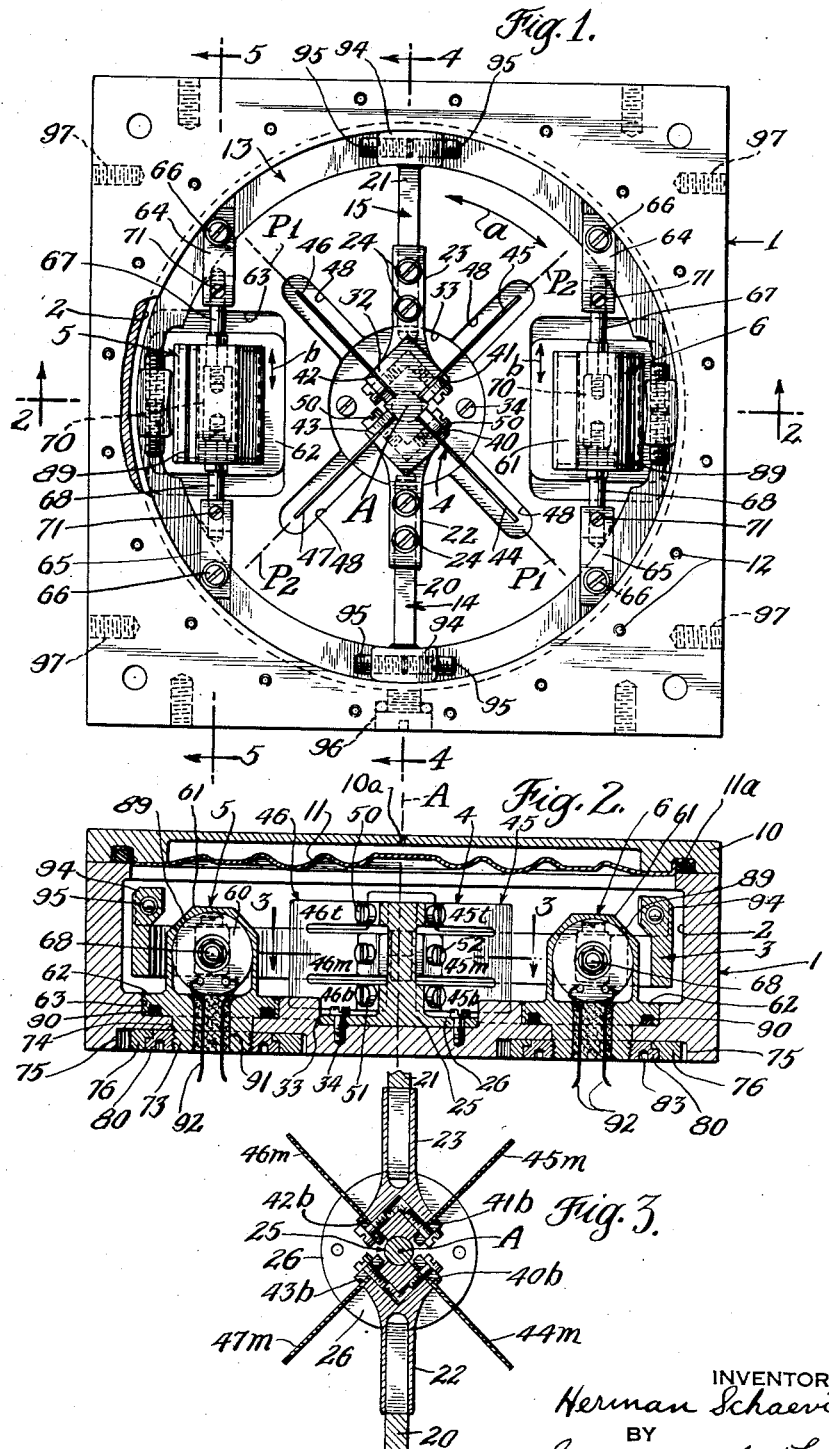
INVENTOR
Herman Schaevitz
BY
Synnestvedt & Lechner
ATTORNEYS Nov. 10, 1959        H. SCHAEVITZ        2,912,657
ANGULAR ACCELEROMETER
Filed May 24, 1956
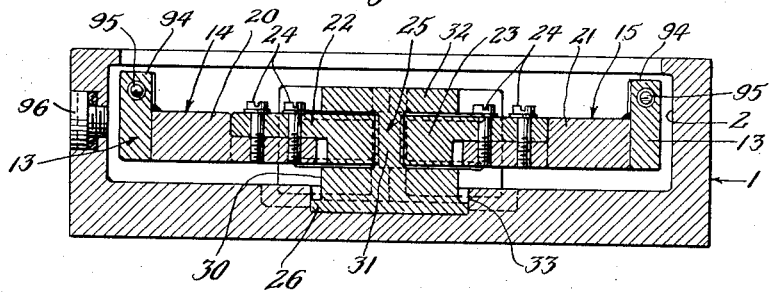
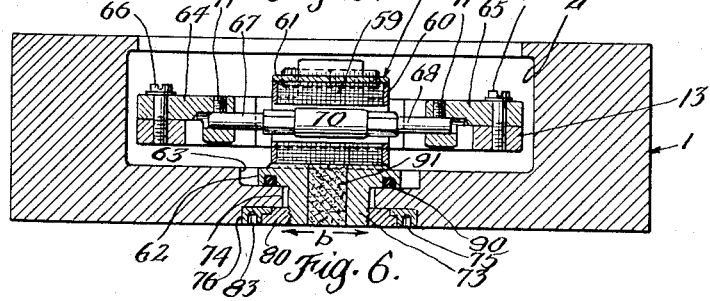
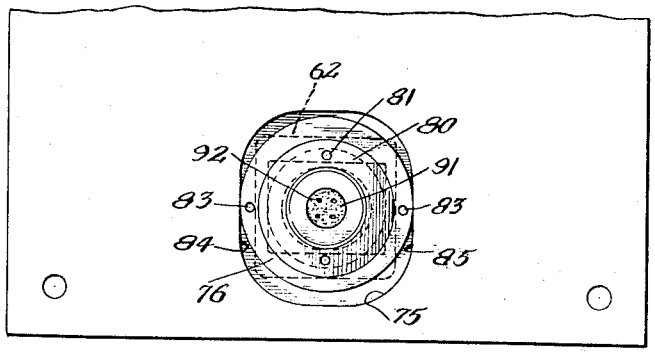
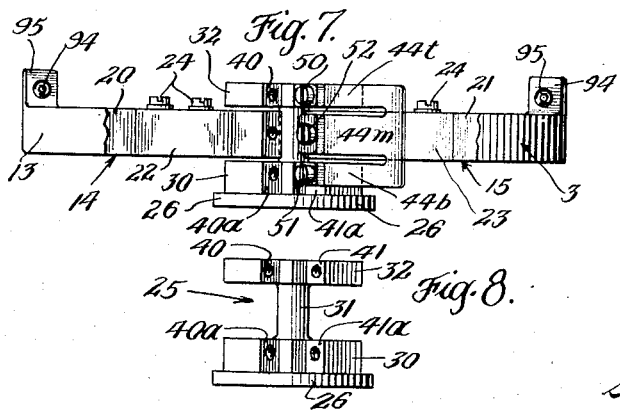
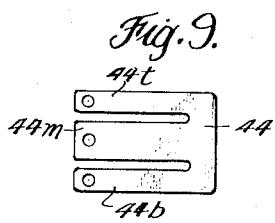
INVENTOR
Herman Schaevitz
BY
Synnestvedt & Lechner
ATTORNEYS

United States Patent Office 2,912,657
Patented Nov. 10, 1959

2,912,657

ANGULAR ACCELEROMETER

Herman Schaevitz, Westmont, N.J., assignor to Schaevitz Engineering, Pennsauken, N.J., a corporation of New Jersey Application May 24, 1956, Serial No. 587,048

4 Claims. (Cl. 336—30)

This invention relates to measuring instruments and, in particular, relates to improvements in instruments for continuously measuring angular acceleration.

One of the objects of the invention is to provide in a continuously measuring angular accelerometer of the type having an inertia ring, improvements in flexure pivots which provide for the ring to be sensitive to acceleration or components of acceleration only in its own plane.

Another object of the invention is to provide in a continuously measuring angular accelerometer, improvements in pivot means and sensing means which cooperate to make the device highly sensitive and accurate.

Another object of the invention is to provide in a continuously measuring angular accelerometer of the type having an inertia ring, improvements in flexure pivots which provide for the center of mass and the axis of relative rotation of the ring to be coaxial.

Another object of the invention is to provide an improved continuously measuring angular accelerometer which is not responsive to either linear acceleration or to angular acceleration except in a desired predetermined direction.

Another object of the invention is to provide in an angular accelerometer, a sensing device with relatively movable elements together with eccentric means for very accurately setting the relative position of the elements for zero acceleration.

Another object of the invention is to provide in an angular accelerometer, an inductance-type sensing device having coil and core elements, the coil being mounted on an eccentric device whereby at zero acceleration the desired position of the elements can be very accurately set.

The foregoing objects, together with other objects and various features of the construction, will be apparent from the following description and drawings wherein:

Figure 1 is a plan view of the device with the diaphragm and cover plate removed;

Figure 2 is a vertical cross section taken on the line 2—2 of Figure 1;

Figure 3 is a fragmentary plan section taken on the line 3—3 of Figure 2;

Figure 4 is a vertical cross section taken on the line 4—4 of Figure 1;

Figure 5 is a vertical cross section taken on the line 5—5 of Figure 1;

Figure 6 is a bottom view of Figure 5 illustrating the eccentric adjusting arrangement;

Figure 7 is a detailed assembly of the flexure pivots;

Figure 8 is a detailed elevational view of the post of the flexure pivot assemply; and Figure 9 is a detailed view of a spring member.

Referring to the drawings, a preferred embodiment of the invention may comprise a housing 1 having a centrally formed chamber 2 within which is disposed an acceleration responsive member 3 mounted in flexure pivots 4, acceleration sensing or detecting devices 5 and 6, and a cover member 10.

Adjacent the cover 10 is a diaphragm 11 which is anchored by means of its outboard edge cooperating with an O-ring 11a, held down by the cover. The cover is secured in the housing by a plurality of screws (not shown) which are adapted to be threaded into the holes 12. Prior to final assembly, the chamber 2 is adapted to be filled with fluid and the housing, diaphragm and cover cooperate with one another in making the chamber 2 fluid-tight. A vent 10a is provided in the cover 10 to permit movement of the diaphragm in the event of liquid expansion.

The acceleration responsive member 3 includes an inertia ring 13, together with a pair of symmetrically disposed radial spokes 14 and 15, which are connected with the flexure pivot 4. The spokes have outer members 20 and 21 and inner members 22 and 23 which are dovetailed together and held in fixed position by the screws 24. The outer members 20 and 21 are fixedly secured to the ring, for example, as by soldering. It is desirable that the acceleration responsive member 3 have a high moment of inertia relative to its size and, therefore, the ring 13 and the spokes 14 and 15 may be formed from a heavy metal such as brass or the like.

The acceleratoin responsive member 3 is adapted to be relatively angularly movable with respect to the housing 1 in opposite directions as indicated by the arrow a. This motion takes place about the acceleration axis A. The invention contemplates novel flexure pivot means which provide for said relative motion, and these will be described following.

As best seen in Figures 2 and 8, a post member generally designated by the numeral 25 comprises a foot portion 26, a lower bearing block 30, an upright 31, and an upper bearing block 32. The post is secured on the housing by means of the base 26 which is disposed (Figure 2) in the recess 33 in the body and held fixed against the housing as by the screws 34.

The upper and lower bearing blocks are identical in configuration, the plan form of which is best shown in Figure 1. Each block has four flat surfaces which lie in planes $P_1$ and $P_2$, which contain the axis A, are at right angles to each other, and are normal to the plane of the ring. For example, the upper block 32 has surfaces 40, 41 lying in planes $P_1$ and $P_2$, and surfaces 42, 43 lying in the same planes. The lower block 30 has corresponding surfaces which lie in the same planes, for example, 40a and 41a in Figure 8. As best seen in Figure 3, the inner members 22 and 23 of the spokes are provided with surfaces 40b, 41b, 42b and 43b which, as shown, lie in the planes containing the corresponding surfaces 40—40a, 41—41a, etc.

As will be apparent, the above-mentioned surfaces are adapted to support the spring beam members 44, 45, 46 and 47, which extend radially of the ring 13 and are disposed in radial slots 48 formed in the bottom of the housing 1. All of the spring beams are identical in construction to the beam 44, as shown in detail in Figure 9. The beams are made from any desirable spring-type metal. All of the legs 44t, 44b and 44m are equal in length and in thickness. In width, the legs 44t and 44b are equal, and each is equal to one-half the width of the middle leg 44m.

The top legs 44t, 45t, etc., of the springs are mounted on the surfaces 40, 41, etc., of the upper bearing block, being held fast thereon by the screw-clamp devices 50. The bottom legs 44b, 45b, etc., are mounted on the lower bearing block surfaces 40a, 41a, etc., by the screw-clamp devices 51. The middle legs 44m, 45m, etc., are mounted on the spoke surfaces 40b, 41b, etc., by the screw-clamp devices 52.

From the foregoing, it will be apparent that the pivot arrangement provides for relative angular motion (about the axis A) between the housing 1 and the acceleration responsive member 3. This relative motion is detected or sensed by the devices 5 and 6, which are preferably linear variable differential transformers. Each transformer is identical in construction and only the transformer 5 will be described.

The primary and secondary coils generally designated by the numeral 59 (Figure 5) of the transformer are disposed on a spool 60 which is mounted on a frame 61. The frame has a base 62, which, as seen in Figure 1, is rectangular in shape and is disposed in an elongated recess 63 formed in the base. The ring 13 carries a pair of blocks 64 and 65 which are secured thereon by the screws 66 and these brackets mount the core stems 67 and 68 of the core element 70. The stems are held on the blocks by the screws 71.

Returning now to the frame 61, it will be seen (Figures 2 and 5) that the frame has a downwardly extending portion 73 which extends through an aperture 74 formed in the housing. The aperture is elongated in the same direction as the recess 63. On the bottom of the housing is a recess 75, in which is disposed an eccentric 76 and a retainer 80 threaded on the extension 73. From an inspection of Figures 2 and 6, it will be apparent that if the retainer 80 is loosened (by a tool operating in the holes 81) and the eccentric 76 is turned (by a tool operating in the holes 83) it will engage with the sides 84 and 85 of the recess and cause the retainer 80 and the frame 61 to move. Since the base 62 of the frame is confined in the recess 63, the motion will be in either one of the directions as indicated by the arrows b. If the ring 13 is in fixed position, it will be apparent that movement as above described will cause relative motion between the housing and coils carried thereby and the core 70. After the core has been adjusted as desired and the retainer tightened up, the O-ring 90 makes a fluid-tight connection.

The transformers mentioned above are of the usual type, i.e., each having a central primary winding and a secondary winding having portions coaxial with and disposed on opposite sides of the primary. When the core is in a central or null position, the voltage output of the secondaries is zero, and when there is relative motion between the coil and the core so that the core is displaced with respect to the central position, a voltage appears across the secondaries which is proportional to the relative displacement. The primaries of the transformers are preferably energized from the same source and the secondaries are connected so that the voltages thereof are additive. The various conductors connected with the coils are preferably brought out through the lower portion 73 of the frame. For example, as seen in Figure 2, the lower portion has an aperture 91 which is filled with an insulating material adapted to support the conductors 92 in spaced-apart relationship. As will be apparent, the conductors extend away from the housing so that appropriate connections can be made thereto. The frame 61 has a slot 89 which prevents the housing from acting as a short-circuited turn.

On the ring 13 are a plurality of upstanding lugs 94, each of which carries a pair of adjusting screws 95. After the device is assembled, screws 95 may be adjusted so that the center of mass of the acceleration responsive member 3 lies in the axis A. A filler plug 96 is provided so that after the cover 10 is in place, the chamber 2 can be filled with fluid. Fluid, of course, is for damping purposes, as is well-known in this art.

In practice, the instrument is adapted to be secured to a body whose acceleration is to be measured. For example, threaded holes 97 in the body may receive screws (not shown) to hold the instrument on the body. In mounting, the housing is set up so that the axis A is parallel to the axis about which the acceleration is to be measured. If the acceleration of the body is, say, in the clockwise direction as viewed in Figure 1, the housing 1 will also move clockwise. The acceleration responsive member 3, due to its inertia and the fact that it is mounted on the flexure pivots 4, will tend to remain in its initial position. Thus, there will be relative angular motion between the housing and the acceleration responsive member, and this motion is about the axis A. The relative angular displacement will be proportional to the acceleration of the body under test. This relative motion will cause the corresponding displacement between cores and coils of the transformers and thereby produce a change in voltage across the secondaries. Suitable measuring devices connected to the secondaries are driven in accordance with the voltage developed and can be calibrated in terms of acceleration and, therefore, provide a means for continuously indicating angular acceleration.

It will be apparent from the foregoing that the relative rotation of the acceleration responsive member should always be about the axis A. Otherwise, acceleration may at one time cause a certain relative displacement of a transformer coil and core and another time cause a different displacement. Such a condition, of course, would be highly undesirable because the measurement would be unreliable and inaccurate. Furthermore, it would be virtually impossible to calibrate out such an effect. The flexure pivot arrangement provides for the acceleration responsive member 3 to always move about the axis A, and it will be understood, therefore, that the pivot arrangement from this standpoint constitutes an important part of the present invention.

The eccentric means for adjusting the relative positions of the core and coil elements of the transformers is an important part of the invention. For example, for maximum acceleration, the relative angular movement between the acceleration responsive member 3 and the housing is only a matter of a few degrees and the relative linear displacement of the core and oil elements of the transformer is only a few thousandths of an inch, and since the device is responsive to acceleration both in the clockwise and counter-clockwise directions, it is important that the center or null position of the transformers be very accurately set. Also, it will be understood that it is most important that the coil and core elements always return to the same relative position when the acceleration is zero. Thus, the eccentric means provides for the null point to be accurately set up and the flexure pivots provide for the coil and core elements to always assume the same relatively adjusted position.

Another advantage of the eccentric adjusting means is that during the nulling procedure, no external mechanical load is imposed on the acceleration responsive member so that the member is retained in its normal zero acceleration position by the action of the flexure pivots.

Another important advantage of the flexure pivot arrangement is that response to undesired accelerations is eliminated. This is important because the sensing device merely detects displacement and cannot tell what causes the displacement. For example, if the instrument is moved linearly in the plane of the drawing, it is important that no relative motion take place between the housing 1 and the acceleration responsive member 3. Otherwise, the sensing devices would detect such motion and hence, would be in error because the motion detected would be linear rather than angular. The same applies if the device were moved linearly or angularly in a plane perpendicular to the plane of the drawing. The foregoing is taken care of by the springs offering a high resistance to motion of the acceleration responsive member 3 in a direction along the axis A and in a direction radially of the axis A.

I claim:

1. In a continuously indicating angular accelerometer: a housing; an inertia ring having rigid, symmetrically disposed radial spokes; a post mounted in the housing at the center of said ring; resilient means interconnecting the inner end of each spoke with said post, each said resilient means comprising a pair of flat, thin leaf elements disposed radially of said ring, one of which is connected at its inner end to said post and the other at its inner end to a spoke, said elements being interconnected at their outer ends, and both being disposed in a radial plane of said ring lying between the radial planes occupied by said spokes, whereby to provide for yielding angular displacement of said ring with respect to said post and to provide for rigidly positioning said ring with respect to said post both radially and axially thereof; and a linear variable differential transformer having a coil mounted on said base and a core drivingly connected with said ring.

2. In a continuously indicating angular accelerometer: a housing; an inertia ring having rigid, symmetrically disposed radial spokes; a post mounted in the housing at the center of said ring; resilient means interconnecting the inner end of each spoke with said post, each said resilient means comprising a pair of flat, thin leaf elements disposed radially of said ring between a pair of spokes, one of which element is connected at its inner end to said post and the other at its inner end to a spoke, said elements being interconnected at their outer ends, and both being disposed in a radial plane of said ring whereby to provide for yielding angular displacement of said ring with respect to said post and to provide for rigidly positioning said ring with respect to said post both radially and axially thereof; a frame slidably mounted on said housing; a coil element mounted on said frame; a core element mounted on said ring within the field of said coil element; and eccentric means for moving said frame for adjusting the relative position of said coil and core elements.

3. In a continuously indicating angular accelerometer: a housing formed with a chamber; a post secured to said housing and extending into said chamber; an upper bearing block on said post, the block having four surfaces, two of which lie in a first plane and the other two lying in a second plane intersecting the first plane; a lower bearing block on said post, the block having four surfaces, two of which lie in said first plane and the other two lying in said second plane; a ring in said chamber and surrounding said post; a pair of rigid spokes connected to the ring and extending radially inwardly thereof toward said post in a plane intersecting both of said planes, each spoke having a pair of bearing surfaces respectively lying in said planes; four E-shaped springs, two of which lie in said first plane and the other two of which lie in said second plane, the upper legs of the springs being respectively connected to the surfaces on said upper bearing block, the lower legs of the springs being respectively connected to the surfaces of the lower bearing block, and the center legs being respectively connected to the surfaces of said spokes; and acceleration detecting means comprising two relatively movable elements, one of which is connected to said ring and the other to said housing.

4. In a continuously indicating angular accelerometer: a housing; a post secured to said housing; a ring surrounding said post; a pair of rigid spokes fixed to said ring and extending radially inwardly thereof toward said post; a plurality of flat leaf springs, disposed between the spokes and the plane of each being perpendicular to the plane of the ring, the springs interconnecting said post and said spokes and providing for relative angular displacement as between the ring and the post; and acceleration detecting means adapted to be actuated when said springs are flexed due to said relative displacement.

References Cited in the file of this patent

UNITED STATES PATENTS

| | | |
|---|---|---|
| 1,693,286 | Pridham | Nov. 27, 1928 |
| 2,290,588 | Groudahl | July 21, 1942 |
| 2,430,757 | Conrad | Nov. 11, 1947 |
| 2,505,636 | Carter | Apr. 25, 1950 |
| 2,637,839 | Piety | May 5, 1953 |
| 2,683,596 | Morrow | July 13, 1954 |
| 2,702,186 | Head | Feb. 15, 1955 |